No. 883,837. PATENTED APR. 7, 1908.
W. C. STEWART.
REINFORCED INSOLE COVERING AND SHAPING MACHINE.
APPLICATION FILED JAN. 11, 1907.

Witnesses.
Franklin E. Low.
Archie B. Colbath.

Inventor.
William C. Stewart.
by Emery & Booth
Attys.

No. 883,837. PATENTED APR. 7, 1908.
W. C. STEWART.
REINFORCED INSOLE COVERING AND SHAPING MACHINE.
APPLICATION FILED JAN. 11, 1907.

Witnesses.
Franklin E. Low
Archie B. Colbath

Inventor:
William C. Stewart
by Emery & Booth
Attys.

No. 883,837. PATENTED APR. 7, 1908.
W. C. STEWART.
REINFORCED INSOLE COVERING AND SHAPING MACHINE.
APPLICATION FILED JAN. 11, 1907.

Witnesses.
Franklin E. Low
Archie B. Colbath

Inventor.
William C. Stewart
by Emery & Booth
Attys

No. 883,837. PATENTED APR. 7, 1908.
W. C. STEWART.
REINFORCED INSOLE COVERING AND SHAPING MACHINE.
APPLICATION FILED JAN. 11, 1907.

Witnesses.
Franklin E. Low.
Archie B. Colbath.

Inventor.
William C. Stewart.
by Emery & Booth
Att'ys

No. 883,837. PATENTED APR. 7, 1908.
W. C. STEWART.
REINFORCED INSOLE COVERING AND SHAPING MACHINE.
APPLICATION FILED JAN. 11, 1907.

Witnesses.
Franklin E. Low.
Archie B. Colbath.

Inventor.
William C. Stewart
by Emery & Booth
Att'ys.

No. 883,837. PATENTED APR. 7, 1908.
W. C. STEWART.
REINFORCED INSOLE COVERING AND SHAPING MACHINE.
APPLICATION FILED JAN. 11, 1907.

Witnesses:
Franklin E. Low
Archie B. Colbath.

Inventor:
William C. Stewart
by Emery & Booth
Attys.

UNITED STATES PATENT OFFICE.

WILLIAM C. STEWART, OF LYNN, MASSACHUSETTS, ASSIGNOR, BY MESNE ASSIGNMENTS, TO THOMAS G. PLANT, OF BOSTON, MASSACHUSETTS.

REINFORCED-INSOLE COVERING AND SHAPING MACHINE.

No. 883,837.     Specification of Letters Patent.     Patented April 7, 1908.

Application filed January 11, 1907. Serial No. 351,838.

*To all whom it may concern:*

Be it known that I, WILLIAM C. STEWART, a subject of the King of Great Britain, and a resident of Lynn, in the county of Essex and State of Massachusetts, have invented an Improvement in Reinforced-Insole Covering and Shaping Machines, of which the following description, in connection with the accompanying drawings, is a specification, like letters on the drawings representing like parts.

In the manufacture of boots and shoes it is common to employ as a substitute for high grade insoles what are known as reinforced insoles, that is, soles made from a light or low grade leather, reinforced at their channeled faces to prevent undue stretching thereof and to strengthen the channel lips for holding the inseam stitches. Such soles, however, have been found to lack that degree of flexibility that is desirable, and possible with soles that are not reinforced, and have been found also to present difficulties due to imperfect covering or laying of the reinforcing material upon the leather foundation.

My invention aims to provide means for making such soles which shall eliminate largely, if not entirely, the above mentioned and other objections.

My invention will be understood best from a description of one embodiment thereof which is shown in the accompanying drawings.

Referring to said drawings: Fig. 4, a view similar to Fig. 3 with the operative parts brought down upon the work; Fig. 5, a cross sectional detail of a friction device to be referred to; Fig. 8, a sectional detail to be referred to; Fig. 13, an enlarged sectional detail on the dotted line 13—13, Fig. 7, to be referred to.

In the manufacture of insoles such as hereinbefore referred to the leather sole that is to form the foundation of the completed sole is first died or rounded to shape after which it is channeled and the channel lip "turned" or "set" in a more or less upturned or vertical position.

Before the fabric is applied, preferably the fabric face as well as the sole face to which it is to be applied are cemented, a rubber cement ordinarily being employed for this purpose. The cemented fabric, which at best is usually but approximately shaped to the sole, is then placed upon the latter by hand and is roughly pressed into position by the fingers of the operative. Obviously, however, when working at speed it is inexpedient, if not impracticable, to work the fabric smoothly over and upon the face of the insole within the upturned lip and down into the bottom of the channel, to and against the face of the upturned lip. The most that is usually attempted is to lay the fabric in position, rub it with the fingers into fairly close contact with the face of the sole throughout the central portion of the forepart, leaving the marginal portion of the fabric, which is to constitute that part that is to be laid into the bottom of the channel and against the inner face of the upturned lip, overlying loosely said upturned lip and projecting beyond the same by a distance represented by the amount required to permit the fabric to reach to the bottom of the channel, thence upward upon the side of the lip. Heretofore, when making such soles, the leather foundation has been laid upon a flat table and the fabric roughly positioned thereon leaving the cemented face of the unpressed margin resting in contact with the edge of the upturned lip or, frequently, in loose contact with a portion of the face of said lip, near its outer edge, especially if the lip has been turned back beyond an upright or vertical position. In the interval between this "rough" or "preliminary" placing of the fabric and the more complete indenting of the same into the channel and against the face of the upturned lip, said contact of the cemented fabric margin with the edge of the upturned lip produces such an adhesion of the one to the other that the action of the indenting machine or other implement employed to work the fabric into the bottom of the channel tends either to pull down the lip to a degree that prevents carrying the fabric beneath it to the bottom of the channel, or else, in tearing away from the lip to which it has adhered, the cement is so far removed or pulled away as to produce a subsequent insufficient adhesion of the fabric to the lip.

My invention, in the embodiment herein to be described, contemplates engaging the lip and holding it in desired upturned position during the rough application of the fabric to begin with, so as to prevent the lip at such time being pulled down and my invention also contemplates providing means for protecting said lip to such an extent that the fabric, with its cemented face, may be freely manipulated adjacent to said lip within or above the same without liability of its cemented face contacting therewith.

My invention, as herein embodied, also contemplates means for applying the fabric to the sole with the latter in its position of approximately greatest flexure, as when in use, so that when the sole has been completed and its shoe placed in use, the reinforcing fabric instead of resisting such flexure, as is the case at present, permits and even contributes to such flexibility thus rendering the sole as easy in its feel to the wearer's foot and as flexible as the ordinary unreinforced sole of the best quality.

With these preliminary remarks, I will now describe the machine illustrated in the drawings and which contains that embodiment of my invention selected for present disclosure thereof.

Figure 1:
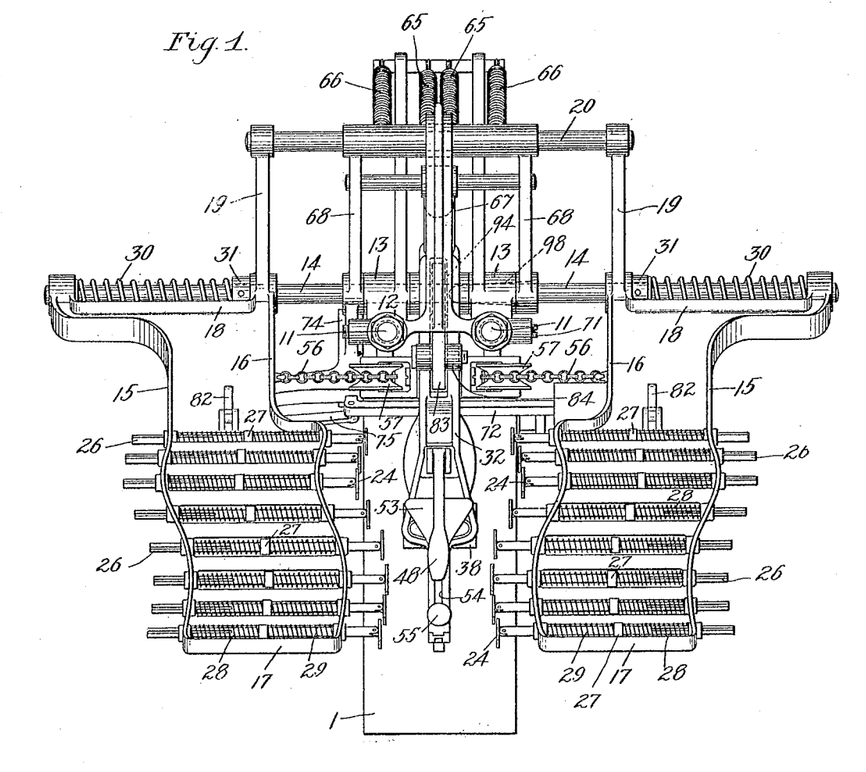
Figure 1 is a plan view of a machine illustrating one embodiment of my invention.
Figure 2:
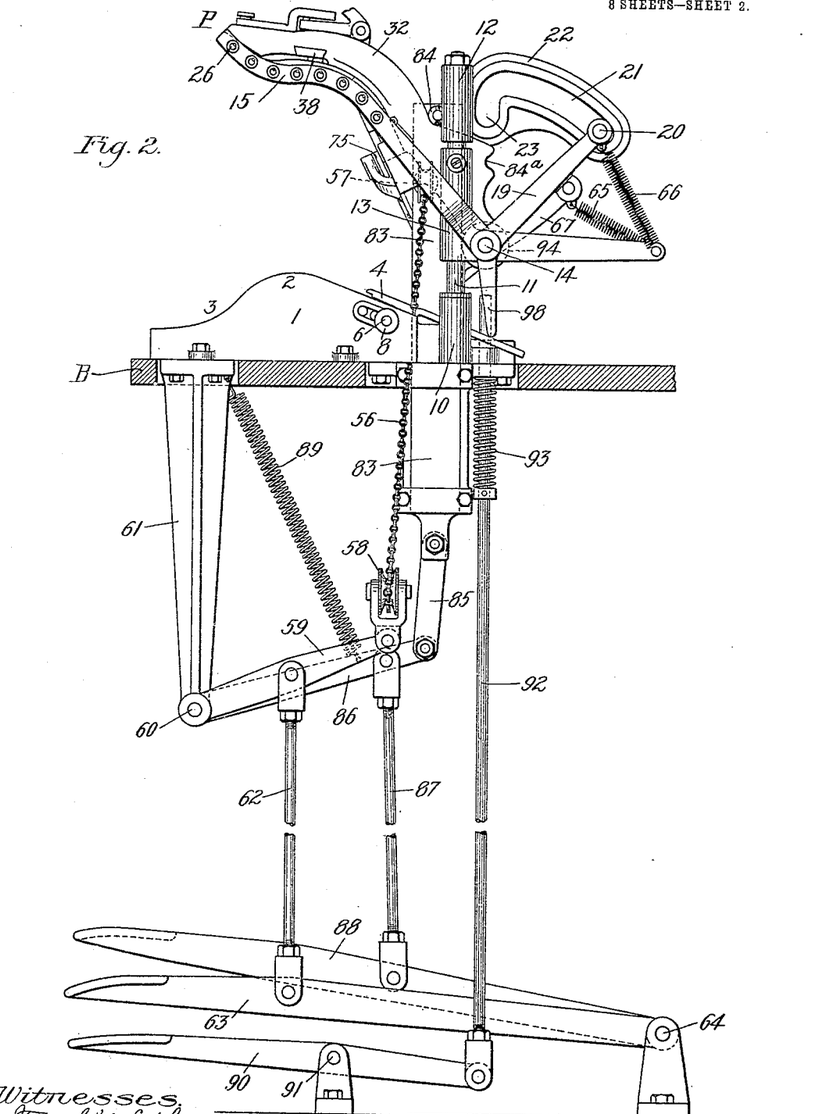
Fig. 2 is a side elevation of the machine, Fig. 1, this figure being on a slightly enlarged scale.

Referring to said drawings, Figs. 1 and 2, the machine illustrated is adapted to be applied to a bench marked B, Fig. 2. Of course, an independent standard or column may be employed if desired in lieu of the bench. Upon the bench or column surface B is mounted the work support 1, which is in the shape of and may be conveniently designated as a form, the same being shaped to give to a shoe sole when placed thereon, as indicated in dotted lines Fig. 3, a bend or flexure in the vicinity of the ball line of the sole that corresponds to the bend or flexure at that point that the sole will be called upon to undergo at each step of the wearer. To this end the form has a convex surface at 2 to produce the ball flexure and a reverse or concave curvature at 3 to approximate or provide for curve in the sole back of the ball. Near its inner or right hand end, Fig. 2, said form is provided with a toe clamp 4, provided with a central depending ear 5, shown in dotted lines Fig. 3 and in full lines in section Fig. 11, which furnishes means by which said clamp is pivoted upon a removable pin 6 (see Fig. 11), normally held in position by a spring 7, said pin having an exteriorly accessible knob or handle 8 to facilitate its withdrawal for a purpose to be described. At its active end said clamp is notched, as at 9, Fig. 3, to permit of the entrance thereunder of the toe end of a sole S. When the toe end of the sole has been thus positioned, the operative permits it to be brought down upon and to clamp such end in position, thereby to hold the sole during its subsequent conformation to the shape of the form and to assist in retaining it during the subsequent operations thereon.

Figure 3:
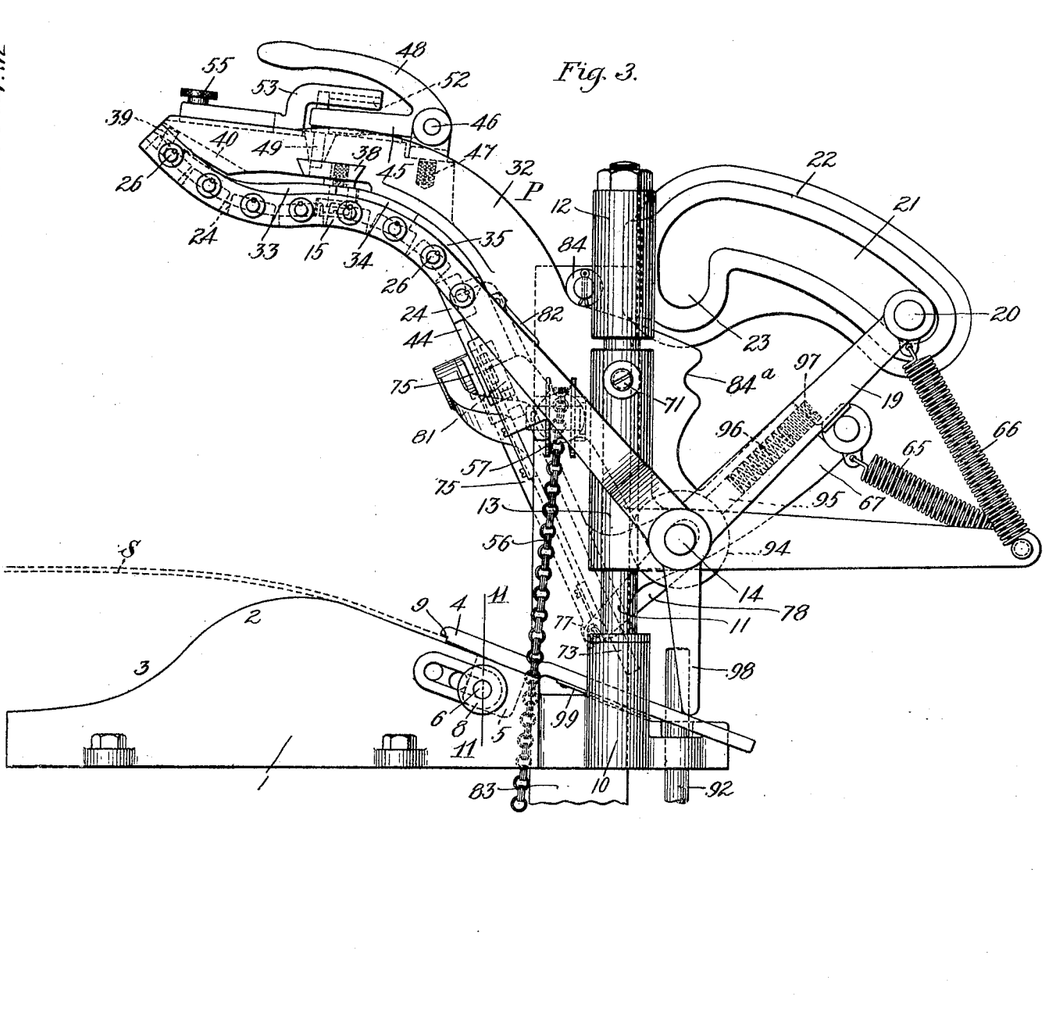
Fig. 3, an enlarged side elevation of the upper portion or head of the machine, Fig. 2.
Figure 11:
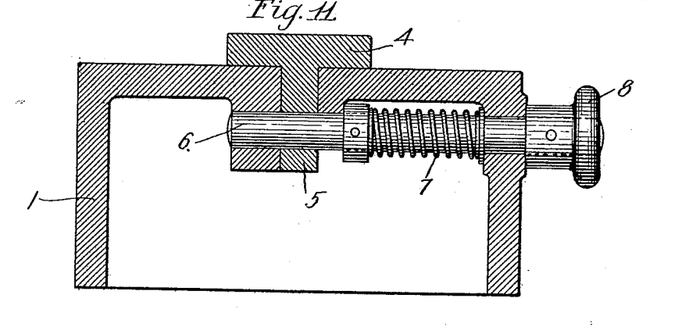
Fig. 11, a cross sectional detail on the dotted line 11—11, Fig. 3, showing the toe adjusting means.

Referring to Fig. 11, the form adjacent the pivotal ear 5 and where it receives and holds the end of the pivot pin 6 is provided with a plurality of holes, as best shown in Fig. 3, into one or another of which said pivot pin may be placed for the purpose of transferring the clamp to accommodate shorter or longer soles, the said form at its front side being slotted to permit said pin to be moved along from one to the other of said holes, as desired. Adjacent the toe end of the form, the table B is provided with column supports 10 for the parallel, vertical guide rods 11, tied together at their upper ends by a stationary cross head 12. Between said cross head and said column supports said guide rods have mounted upon them and to slide freely thereon two sliding heads 13, provided respectively with ears which constitute loose bearings for the transverse shaft 14 (see Fig. 1). Loosely mounted upon this shaft is what I shall for convenience call a hinged or swinging protector frame which, see Fig. 1, consists herein of two wings comprising respectively side members 15, 16, tied at their outer ends by connecting portions 17 and at their inner ends adjacent said shaft by connection portions 18. A thin web may connect these several side and end members. These wing frames are provided respectively with rearwardly extended arms 19, tied together at their rearmost extremities by a transverse rod 20. This rod passes near its middle loosely through the segmental slot 21 in an arm 22, rearwardly extended from the stationary cross head 12 (see Figs. 2 and 3). To facilitate its movement in said slot said rod is provided thereat with a roller or other friction surface, not herein shown. Near its upper end said segmental slot terminates (see Figs. 2 and 3) in a downwardly extended pocket 23, to be hereinafter referred to.

At their free ends the protector wings are provided respectively with series of lip protectors 24, shown as thin plates hinged at 25 to the inner ends of rods 26, slidably mounted in the wing members 15, 16. These rods are preferably splined in their bearings to prevent rotation thereof. Intermediate their ends said slide rods are provided with fast collars 27, between which and the members 15 and 16 at opposite sides thereof are interposed springs 28, 29, which tend to hold the said lip protector rods normally in central positions but permitting the same to yield in either direction as occasion may require. Said protector wings while free to slide transversely along their supporting or hinge rod 14 are, nevertheless, normally maintained in central position thereon by centering springs 30 interposed between their outer ends and collars 31 fast on said shaft. The two wings, in fact the entire presser frame as a whole, may thus be turned about said hinge rod and may be slid transversely thereon, that is, longitudinally of said rod in either direction against the opposing action of one or the other of said springs 30. The general shape of the protector wings and the normal positions of the various protectors 24 approximate a typical sole outline.

Figures 4, 5:
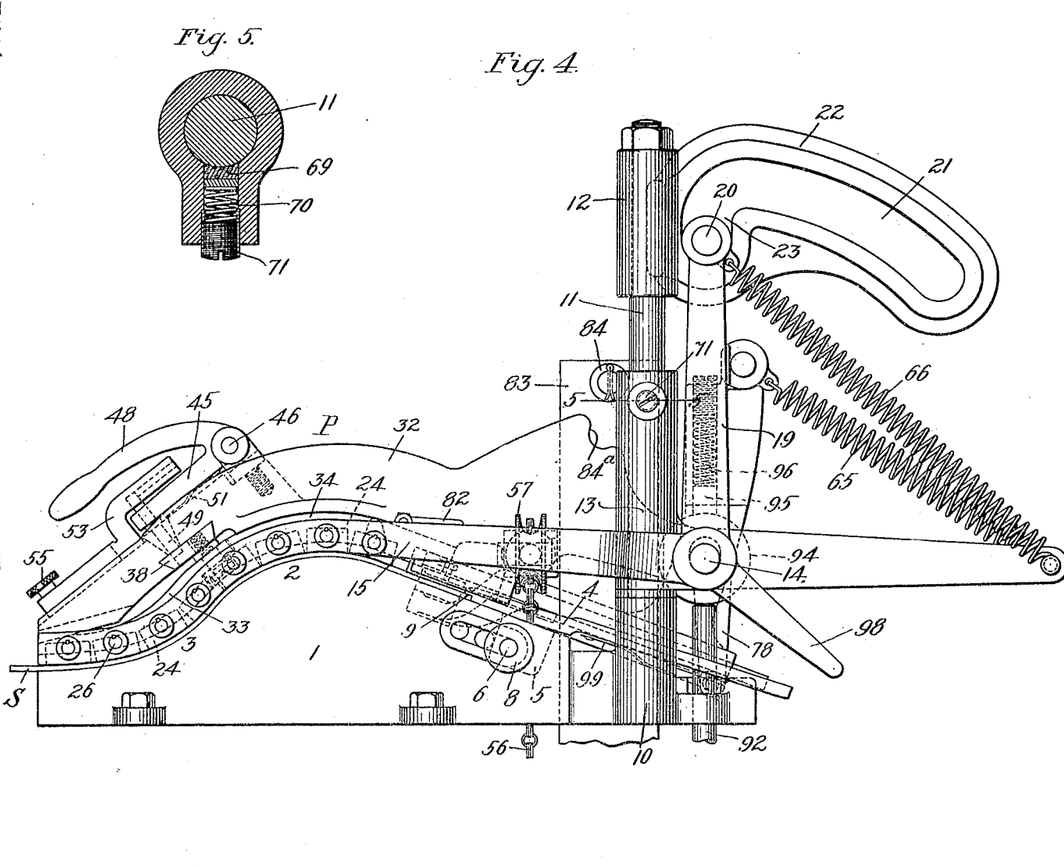

Loosely mounted upon the hinge rod 14 at a point intermediate its length is a central presser P, shown best in Figs. 3, 4, 6, 9 and 10. This presser comprises an arm 32, curved approximately to conform to the curved face of the form and provided at its under side with a plurality of movable presser blocks 33, 34, 35 and 36. The block or member 33 (see Fig. 10) is connected at its inner end by a pivot screw 37 with a transverse dovetailed slide 38, mounted in the said arm 32, the opposite or outer end of said block 33 having a guide pin 39 which plays in a longitudinal slot 40 in said arm. This construction permits the inner or pivoted end of the block to be swung from one to the other side to be made to conform approximately to the right or to the left swing of a sole upon which it is to act, the pin 39 maintaining the outer end of the block approximately in one alinement as for the heel, which need not vary materially even in extreme right or left swing shoes. To the same pivot screw 37 is pivoted the adjacent end of the block 34, the latter being connected by a dowel pin or connection 41 with the adjacent end of the intermediate block 35. Said block 35, at its opposite end, is in turn similarly connected by a dowel pin 41 with the adjacent end of the endmost block 36. Said latter block is, like the block 33, provided with an end guide pin 42 which plays in a longitudinal slot 43 in said arm. Thus both ends or extremities of the articulated presser are maintained in one fixed alinement, while between its extremities the said presser may be flexed or deflexed to one or the other side of a median line, to adapt it to the swing of a sole presented to it. To obtain a continuity of presser face, I have applied to the said blocks a preferably continuous rubber or other face covering 44, which is cemented or otherwise attached to the several blocks and serves to connect them and maintain them in proper positions, yet permitting sufficient flexure of the series in either direction to meet the varying shape of soles. After the sole has been positioned as in dotted lines, Fig. 3, this presser is brought down upon it and forces or presses the sole into close contact with and to receive the curvature of the form, as best indicated in Fig. 4.

For the purpose of effecting needed swing of the presser blocks from one to the other side, for the purpose stated, I have provided the arm 32 (see Figs. 9 and 10) with a shifting arm 45, fulcrumed at 46 in the yoked end of a pin 47, mounted in proper bearings in said arm 32. Said lever 45 is provided with a conveniently arranged handle 48, by which it may be swung about the axis of said pin 47. At its free end said lever 45 engages a locking and actuating pin 49, which depends through a slot in said arm 32 and enters an elongated opening 50 provided therefor in the dovetailed slide 38. The lever 45 is normally held in elevated position by a spring 51 beneath it, which acts to maintain the pin 49 in elevated position with its upper end in a V groove 52, cut in the under side of a slide 53, the latter slotted at 54, and held in adjusted position by a clamping screw 55 on the arm 32. When the said slide is in its inmost position, Fig. 10, the pin 49 is at the apex of the V groove 52, consequently said lever 45 can be swung in neither direction and the face of the presser block can be deflected in neither direction. If, however, said handle lever 48 be depressed, the upper end of the pin 49 will be depressed also, from engagement with the inner walls of the V groove 52, thereby permitting said slide 54 to be adjusted to the left more or less and again clamped. After this adjustment the lever 45 can only be permitted to rise by swinging it to the right or to the left sufficiently for its pin 49 to enter the V groove 52 to one or the other side of its median or apex line. Thus, according to the adjustment of the slide 54, will the right or left position of the pin 49 and the dovetailed slide 38 be more or less to the one or to the other side of the median line of the arm, thus furnishing means for obtaining any desired degree of right or left adjustment of the deflectible face of the presser, and the deflection having been obtained to one side of said median line, it may be quickly shifted to like opposite deflection by depressing the handle lever 48 and shifting the same quickly to the opposite extreme position, where it will lock itself, thus furnishing means for a quick right and left adjustment within limits previously imposed by adjustment of said slide 54. The entire series of deflectible presser blocks may be removed when necessary and substituted by others differently proportioned, for different sizes, widths or shapes of soles.

For the purpose of bringing down into working position the protector frame, as well as the presser arm 32, I have provided a chain 56 (see Figs. 1 and 2) attached at its opposite ends to the inner members 16 of the protector wings described, said chain being carried inwardly from its opposite, end attaching, points to and over a pair of pulleys 57, loosely mounted upon the sides of said presser arm 32. The looped middle portion of said chain is then carried downward through the table B to and about a pulley 58 (see Fig. 2). This pulley is carried upon the end of a lever 59, fulcrumed at 60 upon a bracket 61 depending from the form. Between its ends said lever is connected with a treadle rod 62, operated at its lower end by a treadle 63, fulcrumed at 64. If now said treadle be depressed it will cause the looped middle of said chain similarly to be depressed, thereby to exert a depressing action upon the pulleys 57 on the presser arm 32 over which said chain is passed, as well as upon the wings 15, 16. This depression of the said presser and said wings is resisted (see Fig. 2) by springs 65, 66, the former attached to an arm 67 rising from the presser arm 32, the latter attached to arms 68 (see Fig. 1) loosely mounted on the hinge rod 14, which arms are provided at their free ends with sockets through which said rod 20 passes, that connects the arms 19 of the wing frames described. These springs 65, 66, exceed in their resistance to extension the resistance imposed by the transverse springs 30 (Fig. 1) so that depression of the looped middle of the operating chain 56, while tending to depress both frames carrying the protectors and the presser arm between them, will cause the said wings with their protectors first to close one toward the other, sliding upon the hinge rod 14. By reason of this, before the protectors and pressers have been depressed into position where they will contact with the sole, said protectors have been closed one toward the other until they meet and are arrested by contact with the sides of the presser blocks described. This causes the several presser rod springs 29 to be compressed and thereafter with the parts in this condition both the presser and the protectors are brought down into contact with the sole and depress the latter into full and close contact with the form beneath; and because the presser is narrower than the distance between the upturned lips of the sole, the protectors which are in lateral contact therewith will, of course, be brought down upon the sole likewise within said lips.

As the protector frames are swung downward (see Figs. 2 and 3) the rod 20 swings upward in the segmental slot 21 until its roller reaches the end of said slot when the continued depressing action of the chain, being unable to swing the said rod farther because against the end of said slot, will cause the sleeves 13 to which the presser frames are pivoted to drop bodily on the slide rods 11, the rod 20 dropping to the bottom of the pocket 23. This depression of the slides 13 is controlled by a friction device shown in Fig. 5 and consisting of a pad 69, pressed by a spring 70 controlled by an adjusting screw 71. The treadle 63 is now released and, as it rises, it permits the presser arm 32, under the action of its spring 65 (Fig. 2), to return to its normal elevated position. The protector carrier or wing frames, however, do not swing upward because the rod 20 is locked against swinging movement in the pocket 23 referred to, the result is, therefore, upon the first release of the treadle 63, to cause elevation of the presser but to leave the protectors in their lowermost positions with their lower edges in contact with and resting upon the face of the insole.

Figure 7:
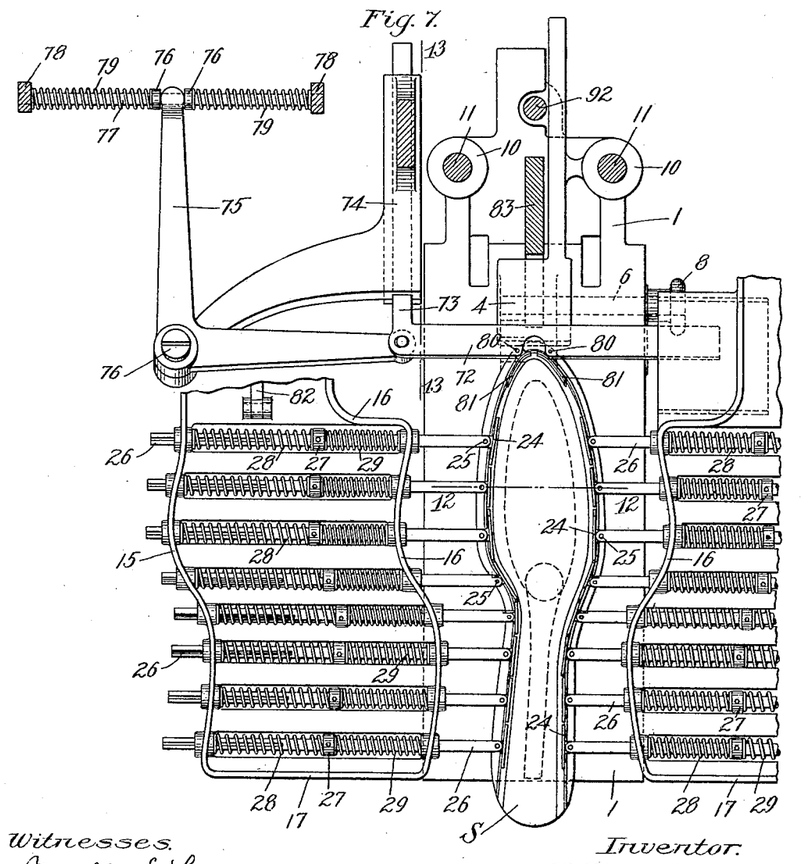
Fig. 7, a horizontal section on the irregular dotted line 7—7, Fig. 6.
Figure 12:
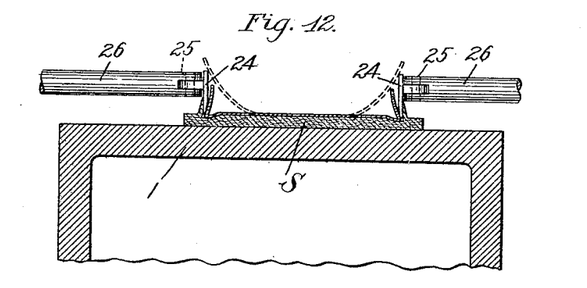
Fig. 12, a sectional detail on the dotted line 12—12, Fig. 7, showing a sole in position and with the operative parts associated therewith.

When the presser and the protector frames were brought down together, it was against the combined action of the springs 65 and 66, there being two of each (see Fig. 1), and this caused the transverse springs 30 to compress in advance of the depression of the presser and protector frames. Having once been brought down, however, and the rod 20 dropped into the pocket 23, the springs 66 attached to the protector frames are prevented from retracting or exerting any action whatsoever tending to return the chain to its original position. This now throws the balance of power in favor of the transverse springs 30, so that as the treadle is released to permit the presser arm to rise to its elevated normal position, the springs 30 recover in advance of the springs 65, consequently, before the presser is elevated the springs 30 separate the wing frames carrying the protectors, causing the latter to drag transversely across the face of the insole until they bring up against and are arrested by contact with the upturned lip at the opposite sides of the sole, as shown in Figs. 7 and 12. This is so timed that the protectors have engaged the lip at the opposite sides of the sole to hold the latter firmly in position upon the former, before the presser leaves the sole, otherwise the sole might be left, for a time at least, without any means for holding it in position.

As the protectors meet the upturned channel lip, they serve to bring the lip up into proper elevated position if, perchance, it has recovered from that position since first turned and set, and said protectors being hinged to their carrying rods, are free to conform to the varying outline of the lip and therefore furnish a complete protection for the lip at the inner face thereof, they being sufficiently long to permit them to reach to or, if desired, overlap one another at the inner lip face. The entire area of the sole face within the lip is now exposed uninterruptedly to the operative, who places the fabric thereon with its cemented face down, pressing with the fingers the middle area of the sole throughout the forepart and, so far as convenient or practicable, down the shank, the margin fabric portions resting upon the protectors which keep the same from contact with the lip at all points. The exposure of the channel is so complete that if desired the operative may use a hand tool to work the fabric well down into the channel, so as to reduce the amount of work the tucking machine is ultimately called upon to perform. To protect the lip formed around the extremity of the toe I have provided a protector, differing somewhat in its construction and mounting from those operating along the sides of the sole.

Figure 13:
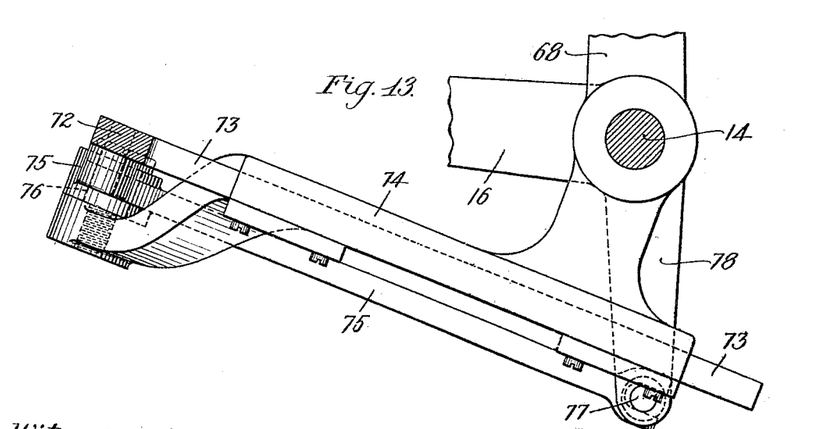

Referring to Figs. 7 and 13, adjacent the toe of the former is arranged a transversely slidable bar 72. This bar, at one of its ends, is supported in a slot in the adjacent protector wing frame, so as to have rising and falling movement therewith. At its opposite end said slide bar is rigidly connected to a longitudinally slidable bar 73 having sliding movement in a bearing 74 depending from one of the arms 68 (Fig. 1), which also rises and falls with the protector carrying frame by reason of its connection with the rod 20 referred to. Thus said slide bar is supported to swing with the protector frame, yet it has a bodily sliding movement toward and from the toe of the sole. Jointed to the end of the slide rod 72 is a bell crank 75, fulcrumed at 76 on an arm of said bearing 74, and having its other arm standing between two collars 76 loose on a transverse shaft 77, carried in the ends of arms 78 depending from and forming integral parts of the hinged ends of the adjacent protector frame wings. Springs 79, 79 are interposed between said collar 76 and said arm 78 which, as said wing frame is drawn inward toward the center of the sole, causes the bell crank lever 75 to be turned to move the slide bar 72 bodily toward the toe end of the sole. Conversely, as the said wing frame is moved outward or away from the median line of the sole the other spring will cause said bell crank to move said slide bar 72 also away from the toe end of the sole. Thus, said slide bar has a movement toward and from the adjacent end of the sole in all respects similar to the movements of the protector frames toward and from the sides of the sole. Referring to Fig. 7, the said slide bar 72 has pivoted to it at 80 two toe protectors 81. These protectors are brought down upon the sole, within the lip at the toe of the sole, when the protector frames are swung down into position and, as the said frames are separated to draw the protectors to the sides of the sole, these toe protectors are drawn against the lip at the toe of the sole. As the protectors approach laterally against the sides of the presser, so do the toe protectors approach lengthwise the sole, against the end of the presser.

Figure 8:
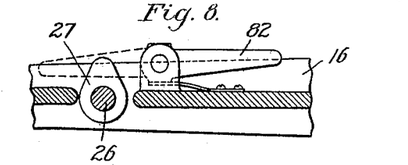
Figure 9:
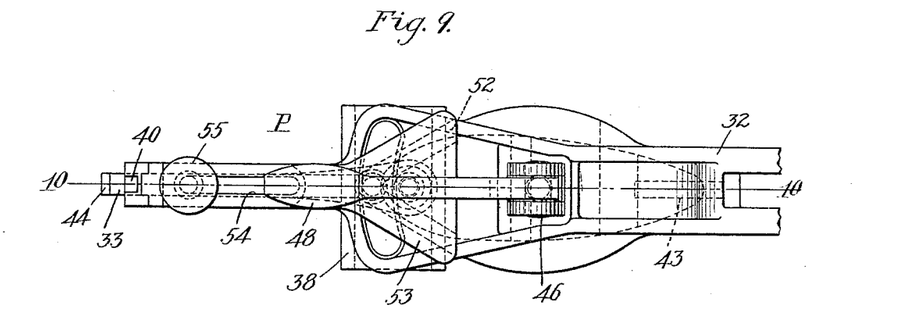
Fig. 9, a plan view of the presser.
Figure 10:
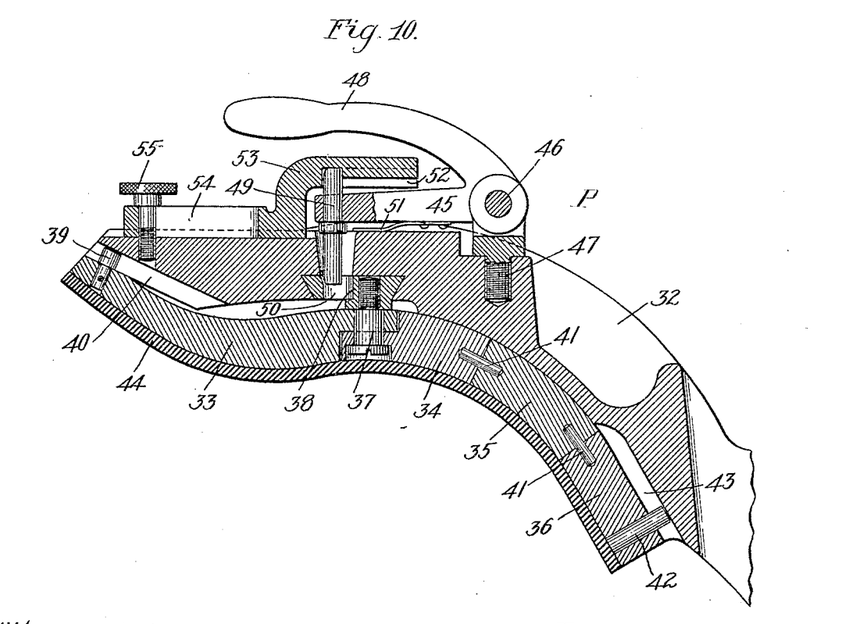
Fig. 10, a longitudinal section thereof on the dotted line 10—10, Fig. 9.

As the toe clamp is adjusted to the left (Fig. 2) to accommodate a smaller size of sole, so the toe protectors should have a farther advancing movement in order to coöperate with the toe end of such shorter sole. The means for operating the toe pressers is such as to produce at all times sufficient advance in the direction of the end of the sole to contact with the end of the presser however short the latter may be, in other words, no adjustment of the toe protectors is necessary for varying lengths of sole or varying lengths of presser; the toe protectors will always advance until they meet the end of the presser wherever that end may be, and will then withdraw until arrested by contact with the sole lip. On a short sole, however, in their advancing movement the said end protectors would be likely to conflict with the endmost of the side protectors. To guard against, this when the sole size reaches a predetermined minimum the operative will, with his hands, spread the two endmost side protectors and lock them in their spread positions by dropping locking pawls 82 (Figs. 7 and 8) in front of the collars 27 thereon, against which the springs 28 are seated. Thus the said endmost side protectors are retained inactive until such time as the length of sole requires or permits their use.

Having now laid the fabric upon the sole and worked it to any desired extent into the channel in front of the protectors, both at the sides and around the toe, the operative a second time brings down the presser for the purpose of pressing the fabric firmly and uniformly upon the face of the leather sole to an extent ordinarily impracticable by the operative using his fingers or any hand tool. This presser was depressed the first time through the chain used to depress the protectors; but the said protectors are now already in their lowermost position, consequently, additional presser depressing means are provided. To this end the machine is provided (see Figs. 2 and 6) with the vertically movable slide 83, mounted in suitable bearings in the table and parts carried thereby, the same at its upper end rising through a slot in the presser arm 32 and provided above said arm with oppositely extended rollers 84 that overlie the walls of said slot, so that said slide is normally supported by said arm. At its lower end said slide (see Fig. 2) is connected by a link 85 with one end of a lever 86, fulcrumed at 60. Said lever is connected by a treadle rod 87 with a second treadle 88, fulcrumed at 64, said lever and said treadle being normally acted upon by an elevating spring 89. When in the initial operation of the machine both the protector frames and the presser are depressed, the slide 83 follows the presser arm downward until such time as said spring 89 overcomes the weight of the slide and its attached treadle and connections, when the said slide remains suspended in mid-position, the presser arm continuing its descent as already described. When said presser is released and permitted to be returned by its springs 65 to its original elevated position, it picks up the said roller studs and the slide and lifts them also to their original positions. When now it is desired to bring the presser down a second time, for final pressing of the fabric upon the face of the leather sole, the operative depresses the treadle 88 and, through the lever 86 and link 85, pulls down the slide 83 thereby making it an actuator to depress the presser arm 32 to cause the presser to be brought down firmly upon the fabric covered sole.

By releasing the second treadle 88, the presser arm is again elevated, and, to lift the rod 20 out of the pocket 23 to permit the protector wing frames also to be returned to their original positions, I have provided a third treadle 90, fulcrumed at 91 and provided at its rear end with a lift rod 92 which rises to position just below the fulcrum rod 14. Depression of this third treadle 90 lifts the rod 92 and thereby lifts the hinge rod 14 and its attached parts until the rod 20 clears the pocket 23, when the springs 66 immediately lift the protector frames to their original positions. The treadle rod 92 is maintained normally depressed by a spring 93 inserted between the table or parts thereof and a lug on said rod.

Figure 6:
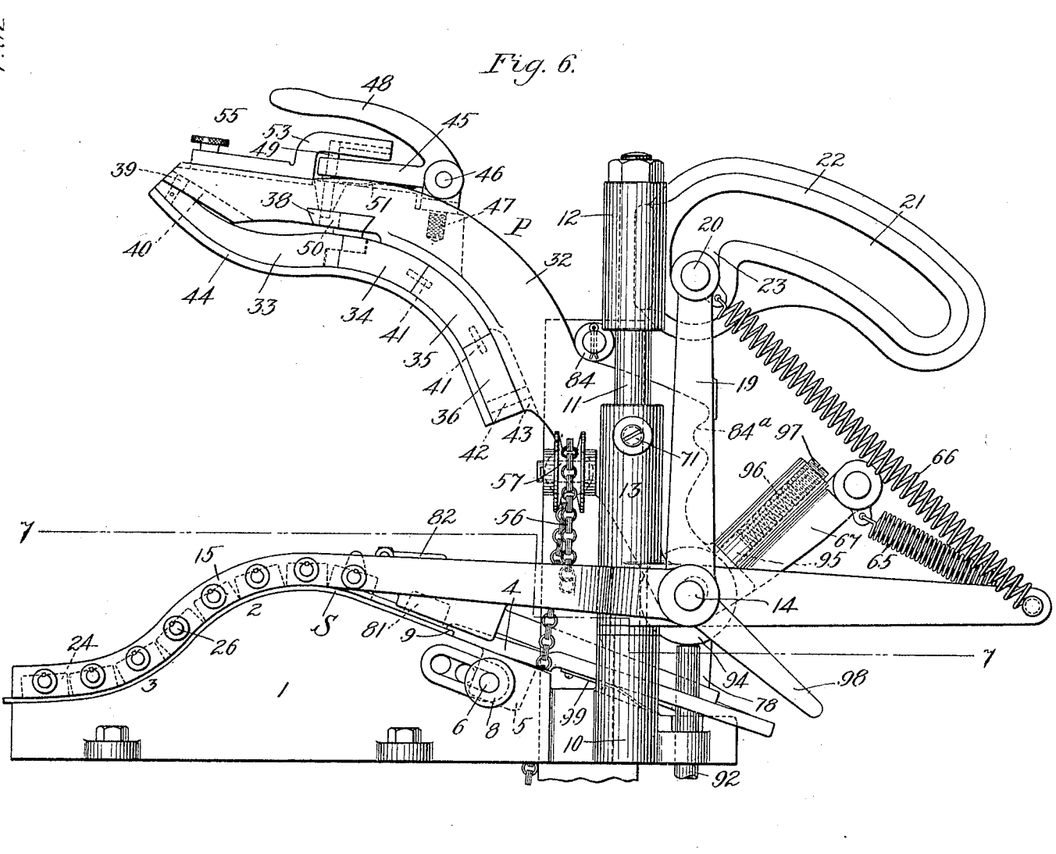
Fig. 6, a view similar to Fig. 4 but with the presser elevated.

When the presser is brought down, particularly the second time, for final pressing of the fabric upon the sole, it is desirable that it have not only the swinging movement described but also a bodily downward movement approximating a parallel motion, for the purpose of engaging the sole from end to end thereof uniformly, to produce a uniform action thereon. To this end the hub of the presser arm 32, adjacent the hinge rod 14, is slotted slightly as best shown in Fig. 6, the direction of the slot being oblique to the rear of the machine when the presser arm is in its elevated position. Surrounding the hinge rod, between the ends of the said slot, is a roller 94 which has a rotative movement only on said rod, and, resting on the periphery of this roll is a friction block 95, pressed against the said roll by a spring 96 seated against a screw 97 in the end of a socket formed on the spring connected portion of the arm 32.

When the presser arm has been turned down approximately to the sole, the slot in the hub thereof is thereby turned into a nearly vertical position so that further action, tending to depress the said presser arm, will cause it not only to tend to swing into a lower position but will also cause its slotted hubbed end to move bodily downward to the limit of said slot or until its presser contacts with the sole throughout. This insures a sort of parallel movement to the presser to insure firm contact with the sole for its entire length. If the spring 96 exceeds the combined strength of the springs 65 then the parallel motion will occur only upon the second depression of the presser but if, as is preferred, said spring does not exceed the others then the parallel movement will occur at each depression of the presser. Just before the presser arm 32 reaches the limit of its depression by the rollers 84, the latter drop into notches 84$^a$ in said arm which have front, substantially vertical sides at that time. These prevent any tendency of the resistance offered at the free end of the arm from lifting the same about the fulcrum 14 because any such lifting tendency would tend to crowd the said rollers laterally which, of course, would be impossible, consequently parallelism is insured. After having thus pressed the fabric the second time in position and returned the parts to their normal positions as described, the operative removes the sole and replaces it with another for a repetition of the movements described.

To release the toe clamp automatically at the completion of the manipulation of the machine, I have provided one of the arms 68, namely at the right (Fig. 1), with a foot 98 (see Fig. 4) which, as the protector frames are elevated to their normal positions, is caused in its descent to engage the tail of the clamping plate and tip it about its fulcrum to free the clamped toe end of the sole. The clamp is normally acted upon by a spring 99 beneath it (see Figs. 4 and 6), which tends to move said clamp into clamping position from which it is removed by action of the foot just described.

By means of the machine described the fabric may be applied to the sole with great rapidity; it is applied more uniformly than can possibly be done by hand; all liability of removing cement from the marginal portions of the fabric is avoided; there is no liability of the fabric adhering to the lip sufficiently to resist the working of the fabric down to the bottom of the channel and there is no danger of pulling the lip downward from its upturned position in an effort to tuck the fabric into place in the channel. Furthermore, the device provides a sole which, when completed, has a tendency to assume a flexed or bent position approximating the position of flexure of the sole when incorporated in a boot in use upon the foot. Thus the reinforced sole, instead of resisting the flexure of the boot when the latter is in use, contributes thereto and provides a sole which in its flexibility resembles more nearly a slashed sole than the contrary, and with none of the alleged objections offered by the slashed sole.

The protectors require no adjustment whatsoever for varying widths of sole, since they always spread until arrested by the lip wherever they find the latter. When rubbing the fabric or pressing it in position, the sole face is exposed to view and to free access by the operative.

From the above description and the illustrated embodiment of the invention, it will be apparent that in the application of a reinforcing fabric, to the surface of a shoe sole, the machine may be variously manipulated and the sequence of operations arranged to suit the special character of work, as will be obvious to one skilled in the art. For instance, the sole having been placed upon the work support or form, the protectors will first be moved inward against the sides of the presser, which has been previously adjusted to treat the sole on the form, and then the presser and protector frame will be moved down upon the sole. The wings of the protector frame will then be moved outward causing the protectors to engage the inner surface of the lip particularly at the upper portion thereof, and the presser will then be raised. The operative may then place the reinforcing fabric upon the sole surface, smoothing it out by hand to the desired extent, the cemented surface of the edge portions being maintained clear of the lip by the lip protectors. The presser may then be lowered again upon the fabric, and by manipulation of handle 48 the parts of the presser may be wiped back and forth over the fabric bringing it into close cemented relation with the sole throughout the sole surface, whereupon the presser may be raised, and the fabric be forced well into the exposed lower surface of the channel either by hand or a suitable tool. Since the protectors are interposed between the lip and the fabric, it is clear that the fabric will be free of the lip and can be readily and easily forced or tucked well into the bottom of the channel. This part of the operation having been completed, the protector frame may then be raised, the reinforced sole removed, and another substituted. Obviously, if desired, the presser may be brought down again after the fabric has been tucked into the channel, and the fabric be thereby subjected to a further treatment of the presser.

Having described one embodiment of my invention and, without limiting myself to details or features that are immaterial to the invention broadly considered, what I claim and desire to secure by Letters Patent is:

1. A work support combined with a plurality of lip protectors, hinge supports therefor, means to turn said supports about their hinges, and means to spread said supports.

2. A work support combined with a plurality of lip protectors, hinged supporting-means therefor and in which they are yieldingly mounted, means to turn said supporting means upon its hinge, and means to spread said supporting means.

3. A work support combined with a plurality of lip protectors, carriers to which they are hinged, hinged supporting means for said carriers and with which the latter are yieldingly connected, and means to swing and also to spread said supporting means.

4. A work supporting form combined with a presser, means to cause relative approach of the same, and means to laterally deflect the alinement of an intermediate portion of said presser.

5. A work supporting form combined with a presser, means to cause relative approach of the same, means to laterally deflect the alinement of an intermediate portion of said presser, and limiting means to restrict the lateral deflection.

6. The combination with a work support of a swinging arm, a plurality of detached and movable presser blocks thereon, means for laterally moving said blocks and a continuous yieldable presser face carried by said blocks.

7. The combination with a work support of a swinging arm, a plurality of detached and laterally movable connected presser blocks thereon, means for laterally moving said blocks and a continuous yieldable presser face carried by said blocks.

8. The combination with a work support of a hinged presser, and means to impart both swinging and rectilinear movements thereto.

9. The combination with a work support of lip protecting means, means to spread the same against the sole lip, and presser means constructed and arranged to act upon the body of the sole.

10. The combination with a work support of lip protecting means constructed and arranged to shield the channel lip of an insole from contact with a reinforcing material during its application to the sole presser means acting on the body of the sole, and means independently to operate the same.

11. The combination with a work support of lip protecting means constructed and arranged to shield the channel lip of an insole from contact with a reinforcing material as it is being applied to the sole, and presser means acting upon the body of the sole within the channel lip, and means to cause simultaneous movement of both means toward the work support and independent return of one of them.

12. In a machine of the class described, the combination of a work support for sustaining a shoe sole with the lip exposed, lip protecting means constructed and arranged to shield the lip, and means relatively to move said protecting means and work support towards each other.

13. In a machine of the character described, the combination of a work support for sustaining a shoe sole, lip protecting means constructed and arranged to shield the lip, and means to move the lip protecting means transversely of the sole.

14. In a machine for applying a fabric to a shoe sole, the combination of means constructed and arranged for protecting the lip from contact with the fabric, and means for causing the lip protecting means to be movable widthwise of the sole.

15. In a reinforced insole covering and shaping machine, the combination of a work support, means for protecting the channel lip from contact with the covering material, and centering means for the lip protecting means to position the same inside the channel lip.

16. In a reinforced insole covering and shaping machine, the combination of means for protecting the channel lip from contact with the covering material, provisions for moving said protecting means to position inside the channel lip, and means for moving the protecting means outward and towards the channel lip it is to protect.

17. In a reinforced insole covering and shaping machine, the combination of means for protecting the channel lip from contact with the covering material as it is being applied, said means comprising a plurality of protectors, constructed and arranged to conform to the general outline of the channel lip when moved into contact therewith, and means for moving said protectors towards the channel lip.

18. In a reinforced insole covering and shaping machine, the combination of means for protecting the channel lip from contact with the covering material as it is being applied, said means comprising a plurality of carriers, lip protecting plates articulated on said carriers, and means for moving said plates toward and from the channel lip.

19. In a machine of the character described, the combination of a plurality of lip protectors to shield the channel lip from contact with a covering fabric, centering means to position the lip protectors inside the channel lip, and means for moving the lip protector towards the centering means.

20. In a machine of the character described, the combination of a plurality of lip protectors to shield the channel lip from contact with a covering fabric as it is being applied to the sole, means for moving the lip protectors in a direction transverse of the sole, and means permitting unequal transverse movement of said lip protectors.

21. In a machine of the character described, the combination of a plurality of lip protectors to shield the channel lip from contact with a covering fabric as it is being applied, means for moving the lip protectors transversely of a sole, and a centering device to determine the position of said lip protectors, said lip protectors being yieldingly mounted to permit variable movements thereof.

22. In a machine for reinforcing and covering an insole, the combination of a protector frame, lip protecting means carried by said frame to shield the lip from contact with the covering material as it is being applied, a support for the insole, and means to relatively move the protector frame and support towards and from each other.

23. In a machine for reinforcing and covering an insole, the combination of a protector frame, a plurality of lip protectors yieldingly mounted in said frame and constructed and arranged to shield the channel lip from contact with the covering material as it is being applied to the sole, and means for moving the lip protectors transversely of the sole.

24. In a machine for reinforcing and covering an insole, the combination of a support for the sole, a plurality of lip protectors constructed and arranged to shield the channel lip from contact with the covering material as it is being applied to the sole, means for moving the lip protectors towards the surface of the sole, and means for moving the lip protectors transversely of the sole.

25. In a machine for reinforcing and covering an insole, the combination of a support for the sole, lip protecting means disposed with relation to each side edge of said sole and constructed and arranged to protect the channel lip from adhering contact with the reinforcing and covering material, means for positioning the lip protecting means between the channel lips at opposite edges of the sole, and means for moving the respective lip protecting means toward the lip it is to protect.

26. A machine for reinforcing and covering an insole, comprising, in combination, a work support, a wing frame disposed for operation at each side thereof, a series of carriers yieldingly mounted in each of said wing frames, a lip protector jointed to each of said carriers, and means for moving the wing frames towards and from each other.

27. A machine for reinforcing and covering an insole, comprising, in combination, a work support, a wing frame disposed for operation at each side thereof, lip protecting means carried by each of said frames, means for moving the wing frames and work support to bring the lip protecting means into operative relation with the sole, and means for moving the wing frames toward and from each other.

28. In a machine for reinforcing an insole, the combination of a support for the sole, a presser, means for protecting the channel lip from contact with the reinforcing material as it is being applied to the sole, and operating means to cause relative approach of the presser and protecting means, and the sole support.

29. In a machine for reinforcing an insole, the combination of a sole supporting form shaped to present a predetermined curvature for applying the reinforcing material to the sole, a presser, means for protecting the channel lip from contact with the reinforcing material as it is being applied to the sole, and operating means to cause relative approach of the presser and protecting means, and the sole supporting form.

30. In a machine for reinforcing an insole, the combination of a sole supporting form shaped to present a predetermined curvature, a presser for applying the reinforcing material to the sole, and means for moving the presser with relation to the sole while it rests upon the reinforcing material.

31. In a machine for reinforcing an insole, the combination of a sole supporting form shaped to present a predetermined curvature in conformity with that assumed by the sole in the act of completing a step, means for applying a reinforcing fabric to the surface of the sole while in such condition of curvature, and operating devices for moving said means with relation to the sole as said means rests upon the reinforcing material.

32. In a machine for reinforcing an insole, the combination of a sole support, a presser having a laterally movable pressing surface, and means for moving the surface laterally of the sole while the presser is in operative relation thereon.

33. In a machine for reinforcing an insole, the combination of a sole support, a presser for applying a reinforcing fabric to a sole and having a pressing surface, means for maintaining the end portions of the surface in position, and means for moving an intermediate portion of the pressing surface laterally.

34. In a machine for reinforcing an insole, the combination of a presser having a pressing surface constructed and arranged for lateral movement intermediate its ends, means for moving the intermediate portion of the pressing surface laterally, and means for determining the extent of said lateral movement.

35. In a machine for reinforcing an insole, the combination of a sole support, means for protecting the channel lip from contact with the reinforcing material as it is being applied to the sole, a presser, operating means for moving the presser and lip protecting means towards the sole support, means for raising the presser, and means independent of the said operating means for again moving the presser towards the sole support.

36. In a machine for reinforcing an insole, the combination of a sole support, means for protecting the channel lip from contact with the reinforcing material as it is being applied to the sole, a presser having a laterally movable pressing surface for adjustment to suit right and left soles, means for moving the lip protecting means toward the presser to center the protecting means to either rights or lefts, and means for relatively moving the presser and lip protecting means and the sole support.

37. In a machine for reinforcing an insole, the combination of a presser having a pressing surface laterally movable at a point intermediate its ends, means permitting lateral movement of said intermediate portion, and a lock to hold the same in adjusted position.

In testimony whereof, I have signed my name to this specification, in the presence of two subscribing witnesses.

WILLIAM C. STEWART.

Witnesses:
    FREDERICK L. EMERY,
    ROBERT H. KAMMLER.